United States Patent
Vaccari

(10) Patent No.: US 6,935,277 B2
(45) Date of Patent: Aug. 30, 2005

(54) LEAD WITH ERGONOMIC HANDGRIP

(75) Inventor: Carlo Vaccari, Castelgomberto (IT)

(73) Assignee: Ferplast SpA, Castelgomberto (IT)

( * ) Notice: Subject to any disclaimer, the term of this patent is extended or adjusted under 35 U.S.C. 154(b) by 0 days.

(21) Appl. No.: 10/343,400

(22) PCT Filed: May 29, 2001

(86) PCT No.: PCT/IT01/00275

§ 371 (c)(1),
(2), (4) Date: Jan. 21, 2003

(87) PCT Pub. No.: WO02/07509

PCT Pub. Date: Jan. 31, 2002

(65) Prior Publication Data

US 2003/0145804 A1 Aug. 7, 2003

(30) Foreign Application Priority Data

Jul. 21, 2000 (IT) .................................... VR2000A0069

(51) Int. Cl.[7] .................... A01K 27/00; B65H 75/34
(52) U.S. Cl. .................................... 119/796; 119/797
(58) Field of Search ............................... 119/796

(56) References Cited

U.S. PATENT DOCUMENTS

| | | | | | |
|---|---|---|---|---|---|
| 2,776,644 A | * | 1/1957 | Fontaine | ..................... | 119/796 |
| 4,488,511 A | * | 12/1984 | Grassano | .................... | 119/798 |
| 4,681,303 A | * | 7/1987 | Grassano | .................... | 267/113 |
| D341,912 S | * | 11/1993 | Ayala | ....................... | D30/153 |
| 5,558,044 A | * | 9/1996 | Nasser et al. | ............... | 119/796 |
| 5,706,764 A | * | 1/1998 | Irbinskas | ..................... | 119/792 |
| 5,915,336 A | * | 6/1999 | Watson | ....................... | 119/797 |
| 5,983,836 A | * | 11/1999 | Chavez | ...................... | 119/797 |
| 6,003,472 A | | 12/1999 | Ball et al. | | |
| 6,148,773 A | * | 11/2000 | Bogdahn | .................... | 119/796 |
| 6,314,917 B1 | * | 11/2001 | Ryan | .......................... | 119/796 |
| 6,345,583 B1 | * | 2/2002 | Thackston et al. | ......... | 114/213 |

FOREIGN PATENT DOCUMENTS

| | | |
|---|---|---|
| CH | 536064 A | 4/1973 |
| DE | 85 27 780 | 12/1985 |
| DE | 86 21 465 | 3/1987 |
| DE | 200 03 740 | 7/2000 |
| FR | 1 021 640 | 2/1953 |
| GB | 2 292 875 A | 3/1996 |

OTHER PUBLICATIONS

International Search Report for PCT/IT01/00275 issued Aug. 21, 2001.

* cited by examiner

*Primary Examiner*—Teri Pham Luu
*Assistant Examiner*—Bret Hayes
(74) *Attorney, Agent, or Firm*—Greenberg Traurig

(57) ABSTRACT

A lead (10) with ergonomic handgrip comprises a casting (11) containing a winding device for a cord or strap (12), a handgrip (14), as well as devices for the temporary blocking and rapid rewinding of said cord or strap (12); said handgrip (14) projects from the casing presenting an access space (14a) for the easy insertion of the user's fingers.

23 Claims, 3 Drawing Sheets

LEAD WITH ERGONOMIC HANDGRIP

TECHNICAL FIELD

This invention concerns a lead with ergonomic handgrip for walking pets.

More in particular, this invention refers to a jerk-resistant lead with automatic winder for walking pets such as, for example, dogs of various sizes, and which has a structure that allows it to be easily gripped and blocked immediately and reliably in any circumstance.

BACKGROUND ART

It is a known fact that pets that have to be walked are usually accompanied using leads with a cord or strap which is variable in length since it can be wound inside a winding device gripped by the user. In this way the animal is free to move a certain distance away from the person accompanying it who thus avoids being subject to sudden jerks.

One drawback is represented by the fact that the handgrip of the lead is not always easy to grip, sometimes giving the user a sensation of precariousness and insecurity.

Another drawback is represented by the fact that when walking in public places, current regulations foresee that a maximum distance of the animal from the person accompanying it must be respected for obvious reasons of safety and thus, in this case, it is obligatory to use a fixed-length lead or one which can be blocked at predetermined length ensuring secure gripping of the lead by the person accompanying the animal.

Document DE-U-8527780 describes a lead comprising an opening system placed directly in the handgrip and based on a spring connected to an independent part of the handgrip.

Said opening system positioned on the handgrip allows the fastening and the block of the lead to several fixed elements. The opening system according to DE-U-8527780 determines a dangerous weakness in the structure of the handgrip particularly with torsion or transversal forces. This is a major drawback since it can cause a loss of the grip or even injuries on the hand if a finger or part of the hand skin is squeezed between the components of the handgrip or the spring directly connected.

Document DE-A-20003740 describes a lead comprising a winding device for cord or strap characterized in that a buffering element is present between the lead case and the cap positioned on the cord.

Document U.S. Pat. No. 6,003,472 describes a retractable leash that includes an integral light.

Document DE-U-8621465 describes a lead comprising a storage space for hygienic bags. In FIGS. 1 and 2 of said document a particular form of embodiment is represented that comprises a lead case with a hollow handgrip to host a roll of hygienic bags.

Document CH-A-536064 describes a lead wherein the length can be regulated and allows the animal to move with a certain freedom with respect to the person holding said lead.

According to CH-A-536064 the cord of leash is hosted inside the handgrip and rolled around a drum that works under the effect of a spring, the length of the cord is regulated by means of fastening device acting on the cord.

DESCRIPTION OF THE INVENTION

The aim of this invention is to provide a lead with ergonomic handgrip which can be easily and immediately blocked.

This invention also proposes to provide a lead which can easily be attached to any fixed structure in order to allow temporary parking of the animal attached to it.

Another aim of this invention is to provide a lead which has a cord that can absorb any jerks caused by abrupt accelerations of decelerations of the animal.

The last but not least aim of this invention is to provide a lead with ergonomic handgrip with a limited production cost so as to be advantageous from a financial point of view.

This is achieved by means of a lead with ergonomic handgrip with the features described in the main claim.

The dependent claims describe advantageous embodiments of the invention.

The lead according to this invention comprises a casing for a winding device of a cord or strap, devices for the temporary blocking and the rapid rewinding of the cord, and is characterised by a handgrip which is integral with and protrudes from the casing, said handgrip presenting an open space for the easy insertion of the user's fingers.

According to this invention the access space can be closed by means of a retainer that connects the handgrip to the casing.

The access space makes the handgrip quick and easy to grip by the user even when wearing gloves.

The retainer guarantees temporary fixing of the lead to any structure in order to park the animal during the absence of the person accompanying it.

The retainer may consist of a strap which can be folded away for fixing by means of velcro or by any appropriate removable fixing means.

ILLUSTRATION OF DRAWINGS

Other features and advantages of the invention will become evident on reading the following description of one embodiment of the invention, given as non-binding example, with the help of the enclosed drawings, in which.

DESCRIPTION OF ONE FORM OF EMBODIMENT

Figure 1:
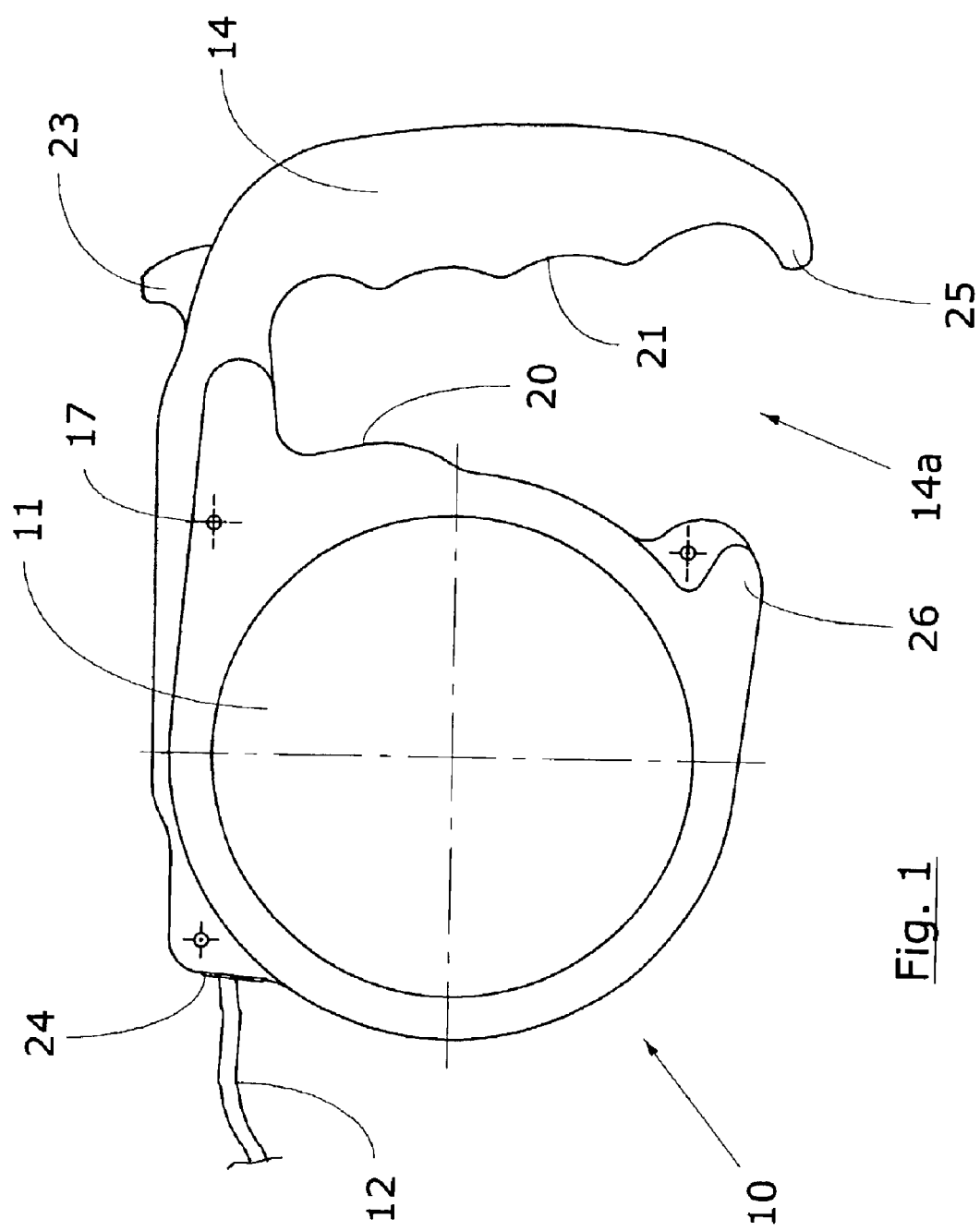
FIG. 1 is a side elevation of a lead with ergonomic handgrip according to the invention.

A lead (10) with ergonomic handgrip, is described, that comprises a casing (11) containing a winding device for a cord or strap (12), a handgrip (14), devices for the temporary blocking and rapid rewinding of said cord or strap (12), where said handgrip (14) projects from the casing comprising an access space (14a) for the easy insertion of the user's fingers whereat it further comprises a retainer (27) connecting one end of said handgrip (14) to said casing (11) said retainer allowing the closure of the access space in an adjustable way.

In the figures, the reference number 10 generally indicates a lead with ergonomic handgrip, in the case in question a lead 10, which comprises a casing 11 containing an automatic winding device to wind a cord or strap 12 equipped at its free end with a spring catch 13 (FIG. 2) which can be fixed to the animal's collar.

According to this invention, the casing 11 is integral with a handgrip 14 protruding from said casing 11 in such a way as to leave an open space 14a for the easy insertion of the user's fingers.

As can be seen from the figures, the casing 11, integral with the handgrip 14, consists of two half casings, preferably made from moulded shockproof rigid plastic material, fixed together, for example, by means of transverse screws 17 positioned around the perimeter of the casing 11.

According to another embodiment (schematically represented in FIG. 3) the handgrip is separate from the casing to which it is attached by means of an articulated joint, which may also be equipped with a hinge and preferably additionally with a return spring to absorb any shocks or jerks.

The outer configuration of the casing 11 presents extensively convex areas in order to avoid the presence of sharp corners which are potentially dangerous both for the animal and the person accompanying it.

The reciprocally adjacent surfaces of the casing 11 and the handgrip 14 present a sequence of curves 20 and 21, whereby the curves 21 of the handgrip 14 are ergonomically designed to ensure secure gripping by the user.

On one side, in correspondence with the section connecting the casing 11 and the handgrip 14, the lead is equipped with at least one brake pushbutton 23 designed to block the cord 12 at a certain length and also to release it.

The cord 12 comes in and out of the casing 11 through a hole 24 in the side opposite to the handgrip 14.

Figure 2:
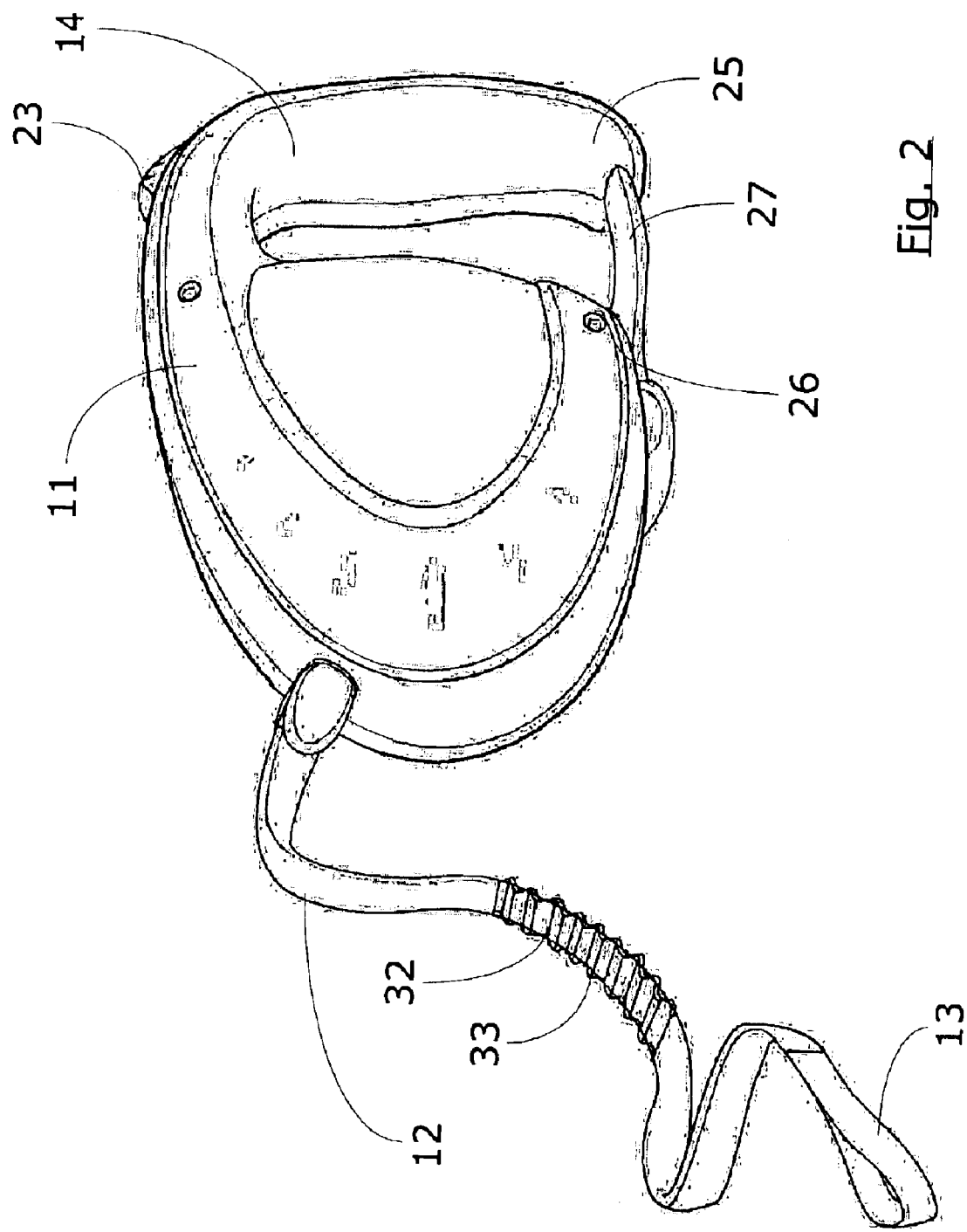
FIG. 2 represents a perspective view of a lead with the cord partially unwound.

With reference to FIG. 2, it can be noted that the projecting end 25 of the handgrip 14 can be connected to the corresponding projection 26 of the casing 11 by means of a strap 27.

The latter can be temporarily fixed to the lead 10, constituting a blocking means for parking the animal during the temporary absence of the person accompanying it.

According to a first embodiment of the invention, the strap 27 can be threaded through a ring attached to the projection 26 so that its free end faces the exterior of the lead 10.

This free end can thus be attached to the central part of the strap 27 for example by means of a VELCRO® hook and loop fastener.

According to a variation, the strap 27 can be made from fabric with a high degree of elasticity so that it adapts to the size of the user's hands and/or fingers.

In this case, the strap 27 is fixed to the end 25 of the handgrip 24 (for example by means of a fixed joint) and attached to the projection 26 of the casing 11 by means of a bayonet connection inserted in a housing in the projection 26.

According to another variation, the strap 27, again a means of detachable fixing to the casing 11, presents a snap coupling which attaches it to the end 25 of the handgrip 14.

With reference to FIG. 2 it can be seen that the section of the cord 12 near the spring clip 13 presents a series of rigid elements 32 alternated with a series of elastic elements 33 designed to act as a shock absorber for any jerks caused by abrupt accelerations or decelerations of the animal.

According to other embodiments, the cord 12 is in any case equipped with at least one elastic element that can absorb the pressure caused by sudden pulling by the animal.

It can be seen that a lead 10 according to this invention is able to fulfil all the pre-set aims; in particular thanks to the presence of the access area 14a it ensures rapid and secure gripping of the handgrip by the user.

The strap 27 makes it possible to temporarily attach the lead 10 to any fixed structure in order to park the animal.

Furthermore, the shock absorber consisting of an elastic element integral with the cord spares the user from undergoing jerks while walking the animal.

Figure 3:
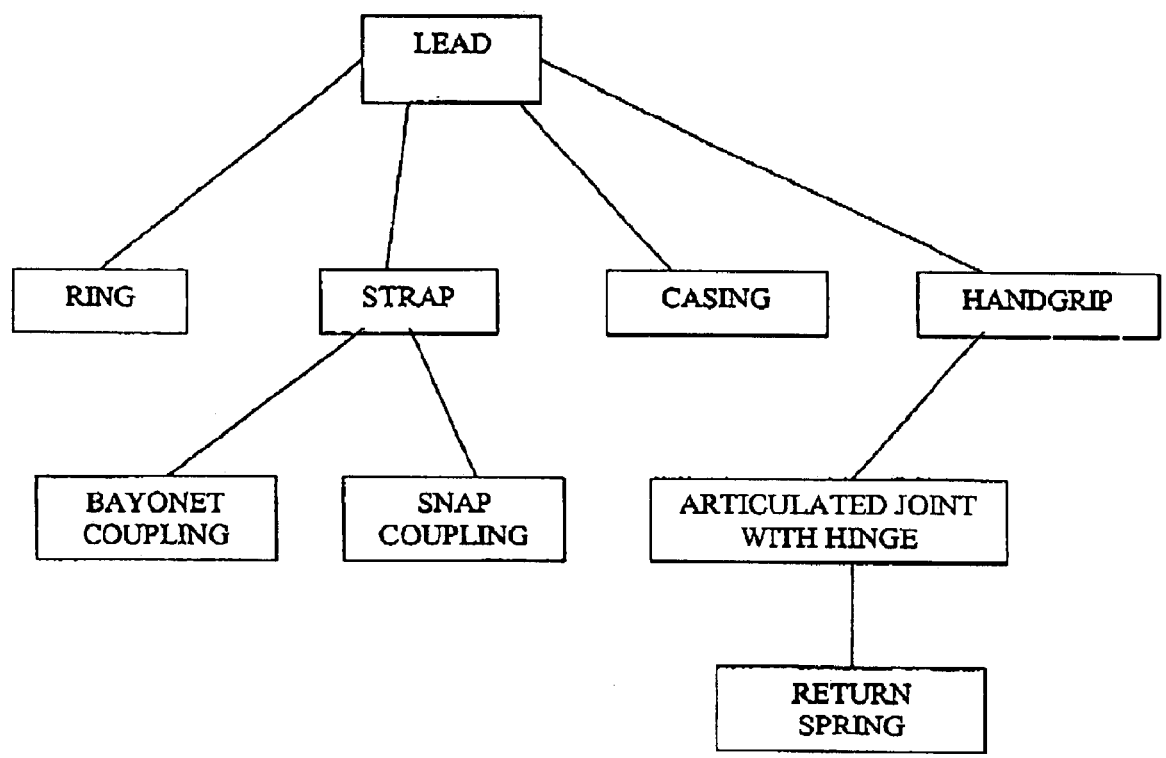
FIG. 3 is a schematic representation of the structure of an embodiment of the lead.

FIG. 3 shows a schematic representation of the structure of an embodiment of the lead, where the lead comprises a casing a handgrip, a ring, and a strap. The handgrip is connected to the casing by means of an articulated joint equipped with a hinge. Preferably, the articulated joint is also equipped with a return spring designed to act as a shock absorber for any jerks caused by the animal.

The invention described above refers to a preferential embodiment of the same.

The invention is nevertheless susceptible to numerous variations all covered by its aims, within the framework of mechanical equivalents.

By way of example, according to another embodiment not shown in the figures, the handgrip of the lead according to this invention is open at the top rather than the bottom as in the embodiment described here in more detail.

What is claimed is:

1. A lead comprising:
    a casing containing a winding device for a cord or a first strap;
    a single piece handgrip projecting from one side of the casing, said handgrip having a proximate end connected to said casing and a distal projecting end, wherein an access space for a user's fingers is provided between said distal projecting end and said casing;
    devices for a temporary blocking and a rapid rewinding of said cord or first strap; and
    a retainer connecting said distal projecting end of said handgrip to said casing, said retainer allowing closure of the access space in an adjustable way, thus allowing a plurality of closed conditions of the access space to be obtained.

2. The lead according to claim 1, wherein said retainer includes a second strap.

3. The lead according to claim 2, wherein said second strap is made from non-rigid fabric.

4. The lead according to claim 2, wherein said lead comprises a ring designed for passage of said second strap, so that said second strap can be folded back on itself.

5. The lead according to claim 2, wherein said strap comprises a VELCRO® hook and loop fastener.

6. The lead according to claim 2, wherein said second strap is made from elastic fabric.

7. The lead according to claim 2, wherein said second strap comprises at least one coupling for attachment to said lead.

8. The lead according to claim 2, wherein said second strap comprises at least one bayonet coupling for attachment to said lead.

9. The lead according to claim 6, wherein said second strap comprises at least one attachment to said lead consisting of a snap coupling.

10. The lead according to claim 1, wherein said cord comprises at least one elastic element designed to act as a shock absorber.

11. The lead according to claim 10, wherein said shock absorber consists of a series of rigid elements alternating with elastic elements.

12. The lead according to claim 1, wherein said handgrip is connected to the casing by means of an articulated joint equipped with a hinge.

13. The lead according to claim 12, wherein said articulated joint is equipped with a return spring designed to act as a shock absorber for any jerks caused by an animal.

14. The lead according to claim 3, wherein said lead comprises a ring designed for passage of said second strap so that said second strap can be folded back on itself.

15. The lead according to claim 3, wherein said second strap comprises a VELCRO® hook and loop fastener.

16. The lead according to claim 4, wherein said second strap comprises a VELCRO® hook and loop fastener.

17. The lead according to claim 7, wherein said second strap comprises at least one attachment to said lead consisting of a snap coupling.

18. The lead according to claim 8, wherein said second strap comprises at least one attachment to said lead consisting of a snap coupling.

19. A lead comprising:

an ergonomic handgrip;

a casing containing a winding device for a cord or strap wherein a first end of the handgrip is connected with the casing and an access region for fingers of a user comprises an access portion provided between a second end of the handgrip and the casing; and a retainer having a retainer first portion connected with either the casing or the handgrip, and a retainer second portion, the retainer second portion either being connected to the other of the casing and the handgrip, thus closing the access portion, or disconnected from the other of the casing and the handgrip, thus allowing the access portion to remain open, wherein connection between the retainer second portion and the other of the casing and the handgrip is an adjustable connection.

20. The lead of claim 19, further comprising an arrangement for the temporary blocking and rapid rewinding of the cord or strap.

21. The lead of claim 19, wherein the handgrip is a single piece handgrip.

22. A lead comprising:

an ergonomic handgrip;

a casing containing a winding device for a cord or strap, wherein a first end of the handgrip is connected with the casing and an access region for fingers of a user comprises an access portion provided between a second end of the handgrip and the casing; and a retainer for adjustably closing the access portion, thus providing a plurality of different connecting conditions between the casing and the handgrip, each connecting condition corresponding to a closed condition of the access portion.

23. The lead of claim 22, wherein the handgrip is a single piece handgrip.

\* \* \* \* \*